United States Patent Office 3,063,973
Patented Nov. 13, 1962

3,063,973
ETHYLENE SULFUR-CURABLE TERPOLYMERS OF A 2-ALKYLNORBORNADIENE, ETHYLENE AND AN ALPHA-OLEFIN
Edward K. Gladding, New Castle, and Jack L. Nyce, Newark, Del., assignors to E. I. du Pont de Nemours and Company, Wilmington, Del., a corporation of Delaware
No Drawing. Filed Dec. 6, 1960, Ser. No. 73,994
7 Claims. (Cl. 260—79.5)

This invention relates to novel hydrocarbon copolymers and more particularly to sulfur-curable elastic copolymers of ethylene, an alpha monoolefin and a 2-alkylnorbornadiene.

Certain alpha monoolefins, such as ethylene and propylene, are very important monomers because they are commercially available in great volume at very low cost. It is known that they can be copolymerized to give products ranging in form from low molecular weight oils to high molecular weight solids.

Unfortunately, these copolymers are not convenient to cure. Unlike natural rubber, SBR, or butyl rubber, they contain practically no carbon-to-carbon double bonds to use as sulfur cure sites; thus, the curing procedures familiar to the rubber trade cannot be used. Alternative methods for curing, such as the use of high energy radiation or the employment of organic peroxides, are more expensive and may limit the choice of antioxidants which can be incorporated into the uncured copolymer.

It is an object of the present invention to provide a new hydrocarbon elastomer. A further object is to provide a sulfur-curable hydrocarbon elastomer prepared from ethylene, an alpha monoolefin and a 2-alkyl-norbornadiene. A still further object is to provide a process for preparing this new hydrocarbon elastomer and a process for curing the same.

These and other objects of this invention are accomplished by providing a sulfur-curable copolymer of ethylene, at least one alpha monoolefin having the structure R—CH=CH$_2$, where R is an alkyl radical of not more than eight carbon atoms and at least one 2-alkylnorbornadiene having about 8 to 24 carbon atoms; said copolymer having an iodine number between 5 and 60.

The novel copolymers of the present invention can be prepared by contacting ethylene, at least one alpha monoolefin, and at least one 2-alkylnorbornadiene in solution in specific inert solvents with specific coordination catalysts, as hereinafter described, at temperatures between about 20° and 100° C. and at atmospheric or superatmospheric pressure. Oxygen, water vapor, and carbon dioxide should be excluded. The copolymers obtained as a result of this process are rubbery, high molecular weight elastomers capable of being sulfur-cured to form elastomeric vulcanizates.

Representative examples of the useful alpha olefins having the structure R—CH=CH$_2$ wherein R is a C$_1$ to C$_8$ alkyl radical include: propylene; 1-butene; 4-methyl-1-pentene; 1-pentene; 1-hexene; 1-heptene; 1-octene; 1-nonene; 1-decene; 5-methyl-1-nonene; 5,5-dimethyl-1-octene; 4-methyl-1-hexene; 4,4-dimethyl-1-pentene; 5-methyl-1-hexene; 4-methyl-1-heptene; 5-methyl-1-heptene; 6-methyl-1-heptene; 4,4-dimethyl-1-hexene; and 5,6,6-trimethyl-1-heptene.

The third component which is used to prepare the novel copolymers of this invention is a 2-alkylnorbornadiene, which may be described by the following structural formula

wherein R' is a C$_1$–C$_{17}$ alkyl radical.

Representative examples include: 2-methylnorbornadiene; 2-ethylnorbornadiene; 2-propylnorbornadiene; 2-isopropylnorbornadiene; 2-n-butylnorbornadiene; 2-isobutylnorbornadiene; 2-tert-butylnorbornadiene; 2-n-amylnorbornadiene; 2-(3-methylbutyl)norbornadiene; 2-neopentylnorbornadiene; 2-n-hexylnorbornadiene; 2-n-octylnorbornadiene; 2-n-nonylnorbornadiene; 2-n-dodecylnorbornadiene; and 2-n-heptadecylnorbornadiene.

To obtain these norbornadienes, alkyl acetylenes having the formula R'—C≡C—H, where R' is C$_1$–C$_{17}$ alkyl, are heated in the absence of a polymerization initiator with cyclopentadiene, preferably at about 175–225° C. Closed reaction vessels made from stainless steel or glass-lined steel are quite satisfactory.

The ethylene monomer unit concentration in the novel copolymers of the present invention ranges in general from about 20% to about 72.5% by weight. Copolymers having more ethylene monomer units tend to be stiff and non-elastomeric. The concentration of the above described alpha monoolefin monomer units ranges in general from about 25% to about 77.5% by weight. Copolymers having a higher alpha monolefin content tend to be stiff and boardy.

Enough 2-alkylnorbornadiene monomer units should be present to provide for sulfur curability, that is, at least about 0.03 gram-mole per hundred grams of elastomer, the maximum amount present by weight should be such as to not interfere seriously with the elastic character of the copolymer, that is, not over about 20% by weight.

As another indication of adequate curability, the iodine number of the novel copolymers should be at least 5. The iodine number is a measure of the unsaturation of the copolymer and this unsaturation arises from two sources (1) the second carbon-carbon double bond of the 2-alkylnorbornadiene and (2) the terminal groups of the polymer chain which, based on infrared evidence, have a double bond of the type: —C—C=C. Iodine numbers in excess of about 60 are undesirable because that much unsaturation is not needed for curability.

Representative examples of copolymers within the scope of the present invention include:
ethylene/propylene/2-methylnorbornadiene;
ethylene/propylene/2-ethylnorbornadiene;
ethylene/1-butene/2-methylnorbornadiene;
ethylene/1-butene/2-ethylnorbornadiene;
ethylene/5,6,6-trimethyl-1-heptene/2-methylnorbornadiene;
ethylene/4,4-dimethyl-1-pentene/2-ethylnorbornadiene;
ethylene/1-decene/2-methylnorbornadiene;
ethylene/propylene/2-isopropylnorbornadiene;
ethylene/propylene/2-(3-methylbutyl)norbornadiene;
ethylene/1-butene/2-n-heptylnorbornadiene;
ethylene/4-methyl-1-hexene/2-n-heptadecylnorbornadiene;
ethylene/1-heptene/2-neopentylnorbornadiene; and
ethylene/1-octene/2-n-dodecylnorbornadiene.

As noted above, the novel copolymers of this invention are prepared in solution in specific inert solvents with specific coordination catalysts. The catalyst used is prepared by mixing vanadium tetrachloride or vanadium oxytrichloride (also called vanadyl chloride) with a reducing compound having the structure

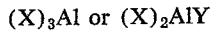

where X is $C_1$–$C_{12}$ alkyl (such as ethyl, isobutyl, octyl, or dodecyl) and Y is a chlorine atom or a bromine atom; the preferred organoaluminum compound is aluminum triisobutyl. The relative proportions of the vanadium salt and the organoaluminum compound may be varied so that the value of the molar ratio of aluminum to vanadium ranges between about 1:1 to 10:1. The preferred concentration of the vanadium salt in the copolymerization reaction zone is about $5 \times 10^{-4}$ to $5 \times 10^{-3}$ moles/liter; however, higher or lower concentrations can be employed. The catalyst may be premixed or it may be formed in situ in the reaction zone.

The preferred solvent is tetrachloroethylene. Liquid paraffins and cycloparaffins such as neopentane, isopentane, pentane, cyclopentane, n-hexane, cyclohexane, n-heptane, 2,2,4-trimethylpentane, methylcyclohexane, and n-octane can be used. Fluorochloro substituted liquid paraffins are also suitable, as for example, trichlorofluoromethane.

In a typical procedure a glass reaction vessel, equipped with a glass agitator, gas inlet and outlet tubes and openings to permit the introduction of liquid reagents, is charged under nitrogen with tetrachloroethylene which has been purified by distillation from calcium hydride or by passage through a column of silica gel.

Agitation is started and a mixture of ethylene and propylene gases is continuously introduced through the gas-inlet tube below the liquid surface. The nitrogen inflow is discontinued. The relative amounts of ethylene and propylene in the gas feed stream are controlled by suitably calibrated rotameters which are placed in the gas feed lines ahead of the T in which the gases are mixed. Prior to their introduction into the reactor, the gases are purified from oxygen, water vapor and other contaminants reactable with aluminum triisobutyl by passage through a scrubber containing aluminum triisobutyl. After the ethylene-propylene mixture has been introduced for 3 to 5 minutes, the tetrachloroethylene is substantially saturated with each monomer. Monomer inflow is continued and excess gas is allowed to escape through the gas outlet tube through a bubble-trap filled with "Nujol," a liquid petrolatum of specific gravity 0.88–0.90 at 60° F. (available from Plough, Inc., Memphis, Tenn.), to prevent backflow of air. 2-methylnorbornadiene, aluminum triisobutyl and vanadium oxytrichloride are then added, in turn, to the tetrachloroethylene solution of ethylene and propylene by means of hypodermic needles through an opening in the reactor sealed with a soft rubber serum cap. The amount of vanadium oxytrichloride added is such that the vanadium concentration in the reaction mass is $5 \times 10^{-4}$ to $5 \times 10^{-3}$ moles/liter. Reaction occurs at once and an intense blue-violet color appears. The monomers are consumed and the temperature of the charge rises. Cooling may be applied, when desired. The concentration of copolymer reaches about 1 to 5 percent by weight in about 20 to 80 minutes when the temperature of the charge ranges between 20° and 60° C. As the copolymerization proceeds, the charge becomes increasingly viscous; it is generally convenient to stop the reaction before the copolymer concentration exceeds about 5% by weight.

In operating the copolymerization process, in general, all of the norbornadiene may be present before the catalyst is added; alternatively, part or all of the norbornadiene may be added during the copolymerization; this introduction may be continuous, or, intermittent.

The catalyst is deactivated by introduction of a low molecular weight alcohol to the reaction mass; representative reagents are isopropanol and n-butanol. The copolymer solution is then extracted with dilute (5–10%) hydrochloric acid, washed with water until acid-free, and introduced onto a hot rotating drum; the solvent is flashed off, leaving a band of copolymer which is subsequently scraped from the drum by a doctor knife; alternatively, the solvent may be evaporated and the copolymer subsequently dried by milling on a rubber roll mill. An antioxident, such as 2,2'-methylenebis(6-tert-butyl-4-methylphenol) or 4,4'-thiobis(2-tert-butyl-5-methylphenol), is incorporated prior to the drying operation to avoid possible oxidation and degradation of the copolymer.

The novel copolymers of this invention are rubbery in nature and may be cured to form highly useful elastomers. Any one of a wide variety of curing procedures may be employed. As has been mentioned above, the copolymers may be readily cured with sulfur. Any of the procedures familiar to those skilled in the processing of natural rubber, butadiene-styrene rubber (SBR), and butyl rubber are suitable.

Various procedures and modifications of sulfur curing are described in Enyclopedia of Chemical Technology, Kirk and Orthmer, published by Interscience Encyclopedia, Inc., New York, 1953, vol. 11, pages 892–927; Principles of High-Polymer Theory and Practice, Schmidt and Marlies, published by McGraw-Hill Book Co., Inc., New York, 1948, pages 556–566; and Chemistry and Technology of Rubber, Davis and Blake, published by Reinhold Publishing Corporation, New York, 1937, chaper VI. Typical procedures are illustrated in the examples which follow.

In place of sulfur curing, which is preferred, a free radical cure may be employed, if desired.

In carrying out a free radical cure of the copolymers, it is merely necessary to mix, by standard procedures, a free radical generator with the copolymer and to heat until a cure is obtained. The temperature range may vary within wide limits, depending upon the particular free radical generator being used. However, heating to temperatures of about 50°–175° C. for a period of 30 minutes to several hours is ordinarily adequate. Longer times may be used in the case of the more thermally stable free radical generators.

The preferred free radical generators which may be incorporated with the copolymers are organic peroxides. Representative examples are bis(alpha, alpha-dimethylbenzyl) peroxide, dibenzoyl peroxide, di-tert-butyl peroxide, cumene hydroperoxide, methyl ethyl ketone peroxide, tert-butyl perbenzoate and di-N-methyl tert-butyl percarbamate. Bis(alpha,alpha-dimethylbenzyl) peroxide, often called dicumyl peroxide, is particularly preferred. About 2.5 to 3 parts by weight is used for every 100 parts by weight of the copolymer. The compounded stock is then cured at about 150° C. for about 30 to 60 minutes.

In addition to the free radical generator, a free radical acceptor may be present such as N-substituted maleimide, an N,N'-substituted bismaleimide, an N,N'-substituted bisacrylamide, a cyclic triacryloylhexahydrotriazine, or mixtures thereof. The quantity of free radical acceptor may range from about 0.5% to 6% by weight of the copolymer. The weight of the free radical acceptor may be less, equal to, or more than the weight of the free radical generator.

A wide variety of compounding agents may be incorporated with these copolymers at the time they are cured in order to improve various properties. Thus, they may be loaded with carbon black in order to increase the tensile strength. Other compounding agents include titanium dioxide and silica.

The copolymers of this invention have many varied uses. They may be employed in the preparation of tires, inner tubes, belts, hose and tubing, wire and cable jackets, footwear, sponges, coated fabrics, and a wide variety of coated or molded articles. They are characterized by good thermal stability and excellent resistance to ozone. The uncured but compounded copolymers are not affected by moisture but can be stored for lengthy periods before shaping and vulcanizing.

The copolymers of the present invention can be prepared by a continuous process at atmospheric or superatmospheric pressure. Thus, solvent, monomers and catalyst may be introduced continuously into a polymerization zone at such a rate as to provide a residence time sufficient to build up the desired concentration of copolymer in the polymerization mass. The residence time may vary widely, from, say, 10 minutes to several hours or more. In general, the residence time will be shorter as the concentrations of monomers and catalysts in the feed stream are increased. The copolymer solution which continually overflows from the polymerization zone is contacted in a subsequent zone with a catalyst deactivator; the copolymer is ultimately continually obtained after suitable continuous purification and isolation procedures.

The following examples will better illustrate the nature of the present invention; however, the invention is not intended to be limited to these examples. Parts are by weight unless otherwise indicated.

Example 1

(A) All apparatus, except the hose connections and traps for holding the aluminum triisobutyl, was flame-dried while being swept with nitrogen; thereafter a constant nitrogen sweep was supplied until introduction of the gaseous monomers; this operation was carried out to prevent contamination by atmospheric oxygen and water vapor.

A 1-liter glass resin flask fitted with a glass panel agitator, a thermometer, gas inlet and outlet tubes, and an opening having a rubber serum cap (to permit the introduction of liquid reagent), was charged under nitrogen at room temperature with 1 liter of silica-gel-purified, nitrogen-sparged tetrachloroethylene. Agitation was begun. A gaseous monomer mixture was then introduced through the gas inlet tube below the tetrachloroethylene surface to supply ethylene and propylene at the respective rates of 1000 cc./minute and 2,300 cc./minute (molar proportion 1:2.3). The relative amount of the monomers in the feed stream were controlled by suitably calibrated flowmeters which were placed in the individual monomer feed lines ahead of the T-joint in which the gases were mixed. Before it entered the reaction flask, the gaseous mixture passed, in turn, through a column packed with silica gel, three traps filled with 15% solutions of aluminum triisobutyl in liquid petrolatum ("Nujol") of specific gravity of 0.88–0.90 (at 60° F.), a trap filled with "Nujol," and a final column packed with silica gel. The tetrachloroethylene in the reaction flask became saturated with ethylene and propylene. Excess gas was allowed to escape through the gas outlet tube into a bubble-trap filled with "Nujol" to prevent back-flow of air into the reaction flask.

After the monomer gas mixture had been fed for about 15 minutes, 2-methylnorbornadiene (1.87 milliliters, 0.015 mole) were introduced. Flame-dried nitrogen-flushed syringes were used to introduce, in turn, 2 milliliters of a tetrachloroethylene solution 1.0 molar in aluminum triisobutyl (0.002 molar), and 1.1 milliliters of a tetrachloroethylene solution 1.0 molar in vanadium oxytrichloride (0.0011 mole) into the reaction flask. The temperature rose immediately from 20° to 25°; application of external cooling held the temperature thereafter between 25 and 27° C.

After 30 minutes the reaction was stopped by introducing 10 milliliters of n-butanol (containing a trace of antioxidant) to deactivate the catalyst. The reaction mixture was then washed by stirring it four times with a total of 1000 cc. of 10% hydrochloric acid and thereafter with two equal volumes of water. Evaporation of the solvent from the organic phase at room temperature over a period of about 16 hours gave a clear film which, after mill drying, weighed 27.2 grams. It contained 61% by weight propylene units and exhibited iodine numbers of about 27.

(B) Ten grams of the above copolymer were compounded on a rubber roll mill with 4 grams of superabrasion furnace black, 0.5 gram of zinc oxide, 0.1 gram of stearic acid, 0.15 gram of tellurium diethyl dithiocarbamate, 0.075 gram of tetramethyl thiuram disulfide, 0.2 gram of sulfur, and 0.1 gram of N-phenyl-beta-naphthylamine. The stock obtained was heated at 150° C. for one hour in a mold to give cured rubbery slabs 5″ x 1″ x 0.07″. They were subsequently cut into ¼″ strips and tested at 25° C. with an "Instron" machine (load 50 lbs., head speed 20″/min.). The following data were obtained: extension at the break, 250%, 260%; tensile strength 1675, 1860 lb./sq. in.; modulus at 200% extension, 1405 and 1450 lb./sq. in.

(C) One hundred grams of the copolymer prepared according to the procedure in (A) above were compounded on a rubber roll mill with 30 grams of superabrasion black, 5 grams of zinc oxide, 1 gram of stearic acid, 1.5 grams of tellurium diethyl dithiocarbamate, 0.75 gram of tetramethyl thiuram disulfide, and one gram of sulfur. The stock was heated for varying periods of time at 150° in a mold to give rubbery slabs 3″ x 6″ x 0.07″. The vulcanizates displayed the following properties at 25° C. when tested according to ASTM Procedure D 412+51 T:

|  | Cure Time (min.) | | |
| --- | --- | --- | --- |
|  | 15 | 30 | 60 |
| $M_{200}$ (lb./sq. in.) | 800 | 1,225 | 1,440 |
| $M_{300}$ (lb./sq. in.) | 1,300 | 2,025 | ------ |
| $T_B$ (lb./sq. in.) | 1,700 | 2,025 | 2,125 |
| $E_B$ (percent) | 390 | 300 | 270 |
| Yerzley Resilience (percent) | 59 | 59 | 61 |

Example 2

The procedure of Example 1(A) was repeated except that only 1.13 milliliters (1.06 grams, 0.010 mole) of 2-methylnorbornadiene were employed. The temperature ranged between 21 and 25° C. The copolymer product (26.6 grams) contained 57% by weight propylene units and a maximum of 3.98% by weight or norbornadiene units and exhibited iodine numbers of about 19.

A portion of this copolymer was compounded, cured and tested by the procedure given in Example 1(B) above. The vulcanizate displayed the following properties at 25° C.: modulus at 200% extension, 788 and 794 lb./sq. in.; tensile strength 1127 and 1070 lb./sq. in.; extension at the break 280 and 290%.

Example 3

The procedure of Example 1(A) above was repeated except that 2 milliliters (0.015 mole) of 2-ethylnorbornadiene was substituted for the 2-methylnorbornadiene indicated therein. The temperature was maintained at 24° to 26° C. After the polymerization had been stopped by introduction of 8 milliliters of n-butyl alcohol (containing 0.1% by weight 4,4'-thiobis(2-tert butyl-5-methyl phenol), the copolymer was isolated according to the procedure of Example 1(A) and mill-dried at 90° to 100° C. Twenty grams of copolymer were obtained having a propylene content of 48% by weight.

The copolymer was compounded on a rubber roll mill according to the following recipe: Copolymer 10 grams, superabrasion furnace black 4 grams, ZnO 0.5 gram, stearic acid 0.1 gram, tellurium diethyl dithiocarbamate 0.15 gram, tetramethylthiuram disulfide 0.075 gram, sulfur 0.2 gram, and n-phenyl-β-naphthylamine 0.1 gram.

The vulcanizate displayed the following properties at 25° C.: modulus at 100% extension, 690 and 740 lb./sq. in.; tensile strength, 1620 and 1945 lb./sq. in.; extension at the break, 200 and 220%.

As many widely different embodiments of this inven-

What is claimed is:

1. A sulfur-curable copolymer of (a) ethylene, (b) at least one alpha monoolefin having the structure $$R-CH=CH_2$$

wherein R is an alkyl radical of not more than eight carbon atoms and (c) at least one 2-alkylnorbornadiene having from about 8 to 24 carbon atoms; said copolymer having an iodine number between 5 and 60 and containing from about 20% to 72.5% by weight of ethylene units, 25% to 77.5% by weight of alpha monoolefin units and not more than 20% by weight of norbornadiene units.

2. A copolymer according to claim 1 wherein the alpha monoolefin is propylene and the norbornadiene is 2-methylnorbornadiene.

3. A copolymer according to claim 1 wherein the alpha monoolefin is propylene and the norbornadiene is 2-ethylnorbornadiene.

4. A copolymer according to claim 1 wherein the alpha monoolefin is 1-butene and the norbornadiene is 2-methylnorbornadiene.

5. A copolymer according to claim 1 wherein the alpha monoolefin is 1-butene and the norbornadiene is 2-ethylnorbornadiene.

6. A cured elastomer obtained by curing the copolymer of claim 1 with sulfur.

7. An elastomeric, sulfur-curable copolymer of (a) ethylene, (b) propylene and (c) 2-methylnorbornadiene; said copolymer having an iodine number between 19 and 27 and containing from 57 to 61% by weight of propylene units and not more than 3.98% by weight of 2-methylnorbornadiene units.

References Cited in the file of this patent

UNITED STATES PATENTS 2,933,480  Gresham et al. _____ Apr. 19, 1960

OTHER REFERENCES

Chemical Abstracts, vol. 52 (1958), page 18,248.